(12) United States Patent  
McSchooler

(10) Patent No.: US 11,006,154 B2  
(45) Date of Patent: May 11, 2021

(54) SELECTED REPLACEMENT OF DIGITAL IMAGERY PORTIONS USING AUGMENTED REALITY

(71) Applicant: DISH Technologies L.L.C., Englewood, CO (US)

(72) Inventor: Jeffrey McSchooler, Englewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 16/022,350

(22) Filed: Jun. 28, 2018

(65) Prior Publication Data

US 2019/0313133 A1  Oct. 10, 2019

Related U.S. Application Data

(60) Provisional application No. 62/652,631, filed on Apr. 4, 2018.

(51) Int. Cl.
*H04N 21/234* (2011.01)
*H04N 21/2187* (2011.01)
*H04N 21/81* (2011.01)

(52) U.S. Cl.
CPC ... *H04N 21/23412* (2013.01); *H04N 21/2187* (2013.01); *H04N 21/812* (2013.01)

(58) Field of Classification Search
CPC ......... H04N 21/23412; H04N 21/2187; H04N 21/812
See application file for complete search history.

(56) References Cited

U.S. PATENT DOCUMENTS

| | | | | |
|---|---|---|---|---|
| 7,116,342 | B2* | 10/2006 | Dengler | H04N 5/272 |
| | | | | 345/630 |
| 7,230,653 | B1* | 6/2007 | Overton | H04N 5/2723 |
| | | | | 348/584 |
| 9,880,386 | B2* | 1/2018 | Clavin | G02B 27/017 |
| 2011/0211812 | A1* | 9/2011 | Tzoukermann | H04N 21/4394 |
| | | | | 386/250 |
| 2012/0127284 | A1* | 5/2012 | Bar-Zeev | G02B 27/017 |
| | | | | 348/53 |
| 2013/0117781 | A1* | 5/2013 | Kim | H04N 21/458 |
| | | | | 725/32 |
| 2014/0002496 | A1* | 1/2014 | Lamb | G06F 3/14 |
| | | | | 345/633 |
| 2014/0176802 | A1* | 6/2014 | Yu | H04N 5/147 |
| | | | | 348/700 |
| 2015/0016712 | A1* | 1/2015 | Rhoads | H04N 7/185 |
| | | | | 382/154 |
| 2016/0028968 | A1* | 1/2016 | Affaticati | H04N 5/2723 |
| | | | | 348/47 |
| 2016/0042569 | A1* | 2/2016 | Wyld | G06T 19/006 |
| | | | | 345/633 |

(Continued)

*Primary Examiner* — Randy A Flynn
(74) *Attorney, Agent, or Firm* — Lorenz & Kopf, LLP

(57) ABSTRACT

Systems, devices and automated processes augment television broadcasts with digital content that automatically replaces static portions of the captured imagery. In a video broadcast of a live event, for example, signs or other advertisements that are physically present in the event venue can be automatically replaced in television broadcasts of the event by virtual imagery of other signs or objects, as desired.

9 Claims, 2 Drawing Sheets

(56) References Cited

U.S. PATENT DOCUMENTS

Figure 1:
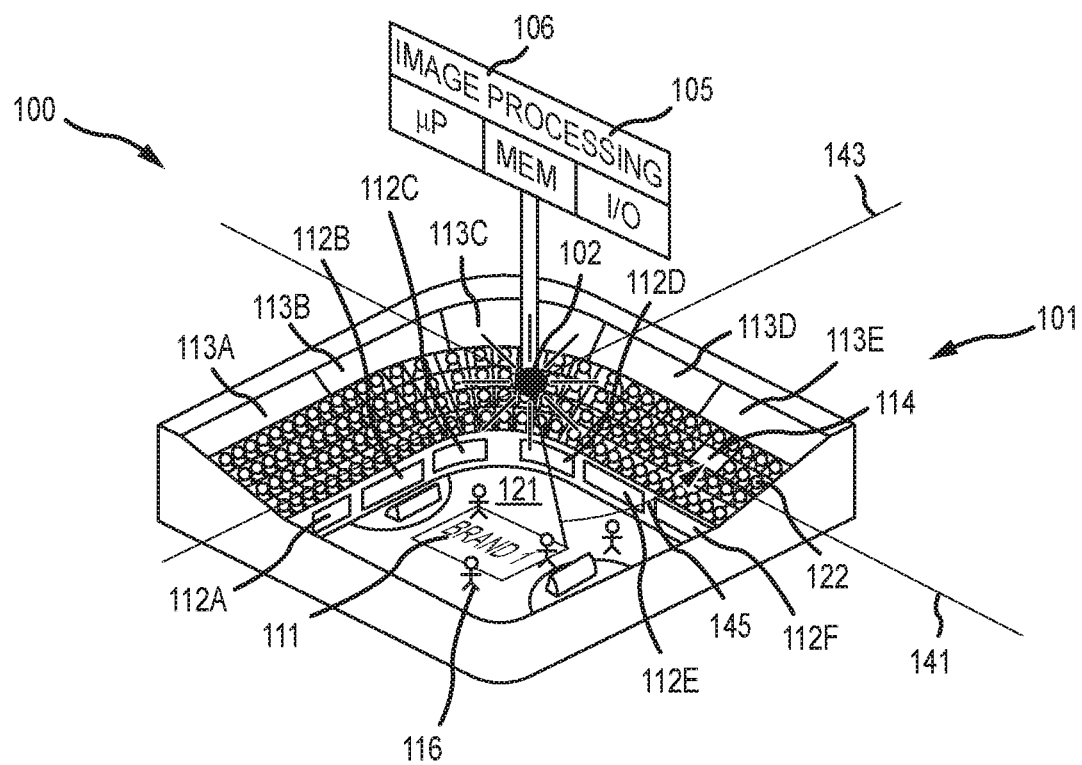

| | | | |
|---|---|---|---|
| 2016/0132991 A1* | 5/2016 | Fukushi | H04N 5/2628 |
| | | | 345/667 |
| 2017/0278289 A1* | 9/2017 | Marino | G06Q 30/0276 |
| 2018/0005450 A1* | 1/2018 | Daniels | G06T 19/006 |
| 2018/0053284 A1* | 2/2018 | Rodriguez | G06T 5/006 |
| 2018/0150696 A1* | 5/2018 | Li | G06K 9/00718 |

* cited by examiner

SELECTED REPLACEMENT OF DIGITAL IMAGERY PORTIONS USING AUGMENTED REALITY

PRIORITY CLAIM

This application claims the benefit of U.S. Provisional Application No. 62/652,631, filed on Apr. 4, 2018.

TECHNICAL FIELD

The following discussion generally relates to digital manipulation of video content, particularly broadcasts of live television programs. More particularly, the following discussion relates to the automated digital replacement of certain static portions of imagery that can be present in broadcast television content.

BACKGROUND

Digital technology continues to revolutionize television viewing. In addition to the wealth of content that is now available, emerging technologies such as time and place shifting allow viewers to experience increasing amounts of media content at the times and places that are most convenient for them. As viewers gain more control over the content that they view, however, it can be an increasing challenge to maintain the viewer's attention.

In recent years, video producers and broadcasters have looked to digital enhancement of live video content (e.g., broadcasts of sporting events) to make the viewer experience more informative and engaging. Most sports broadcasts, for example, incorporate graphical overlays that show the score, time remaining and/or other information to the viewer. Additional enhancements have included emphasizing the puck in broadcasts of hockey matches, highlighting of first down or line of scrimmage positions in broadcasts of football games, and many others. These limited features have been well-received by the viewers, but there is nevertheless a substantial need to make programming more dynamic, and therefore more interesting to the viewer.

It is therefore desirable to create systems and processes to automatically recognize and replace static images in live-captured digital video content. Other desirable features and characteristics will become apparent from the subsequent detailed description and the appended claims, taken in conjunction with the accompanying drawings and this background section.

BRIEF SUMMARY

Various embodiments provide systems, devices and automated processes to augment television broadcasts with digital content that automatically replaces static portions of the captured imagery. Such static portions could include billboards, placards, signs, advertisements, scoreboards and/or other features that are physically present in the stadium or other environment being filmed, and that are therefore viewable in live video content captured during the broadcast event. In a video broadcast of a sporting event, for example, signs or other advertisements that are physically present in the stadium can be temporarily (or permanently) replaced in television broadcasts of the event by virtual imagery of other signs or objects, as desired. Using techniques of augmented reality, image replacement can allow a venue, team, league, broadcaster, content aggregator and/or other party to increase advertising revenue without increasing distractions to the viewer. Automated ad replacement can occur through real-time processing of live video imagery so that there is little or no detraction from the viewer's experience. Indeed, by replacing static signs/images with updated imagery throughout the broadcast, the viewer experience can be made even more interesting and engaging.

Some embodiments described below provide processes that are executable by computing devices to automatically replace static imagery in live video content. In one example, a process suitably comprises: receiving live video content from a camera that captures an event occurring in a physical space; initially identifying at least one location in the received live video content that represents static imagery for image replacement; receiving subsequent live video content from the camera that captures the event occurring in the physical space; identifying dynamic imagery in the subsequent live video occurring within the at least one replacement location; adapting the subsequent live video to replace the static imagery at the least one replacement location with a replacement image while retaining the dynamic imagery in the subsequent live video as an overlay of the static image; and providing the adapted subsequent live video as an output.

Other embodiments provide computer systems that comprise an interface to a camera to receive live video content and a processor that performs real-time replacement of static imagery in the live video content. The image replacement may be performed according to any of the various techniques described herein. In one example, the image replacement process performed by the processor of the computer system suitably comprises: receiving live video content from a camera that captures an event occurring in a physical space; initially identifying at least one location in the received live video content that represents static imagery for image replacement; receiving subsequent live video content from the camera that captures the event occurring in the physical space; identifying dynamic imagery in the subsequent live video occurring within the at least one replacement location; adapting the subsequent live video to replace the static imagery at the least one replacement location with a replacement image while retaining the dynamic imagery in the subsequent live video as an overlay of the static image; and providing the adapted subsequent live video as an output.

Further embodiments augment the systems and processes by performing addition analysis and/or manipulation of the captured imagery to match distortion of the imagery caused by moving cameras, to adjust the luminance of the replaced imagery, and/or to otherwise enhance the digital media that is provided to the viewer. These and other examples, aspects, embodiments and other features are described in more detail below.

BRIEF DESCRIPTION OF THE DRAWING FIGURES

Figure 2:
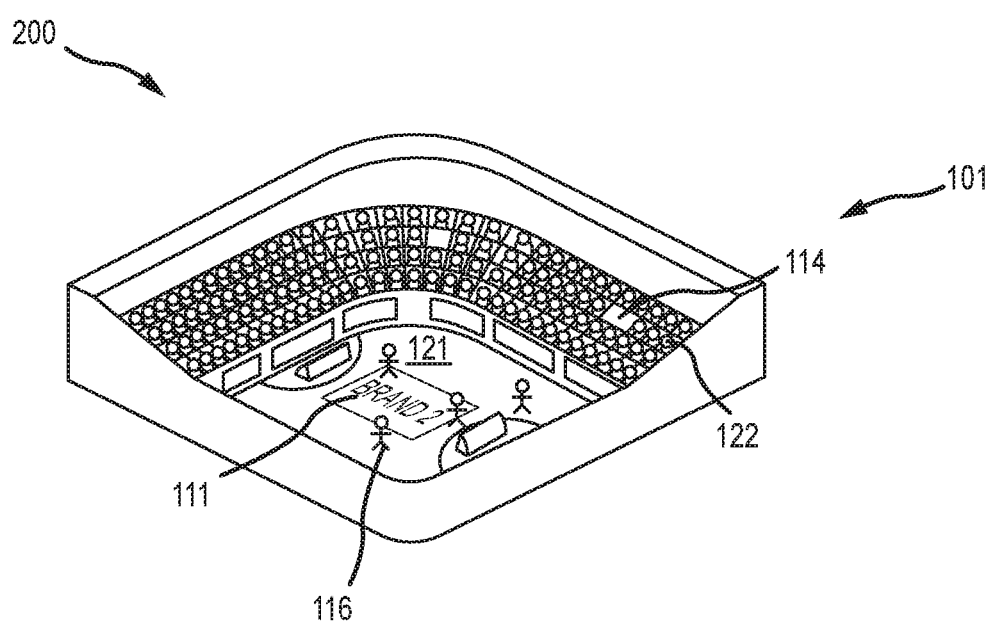
Figure 3:
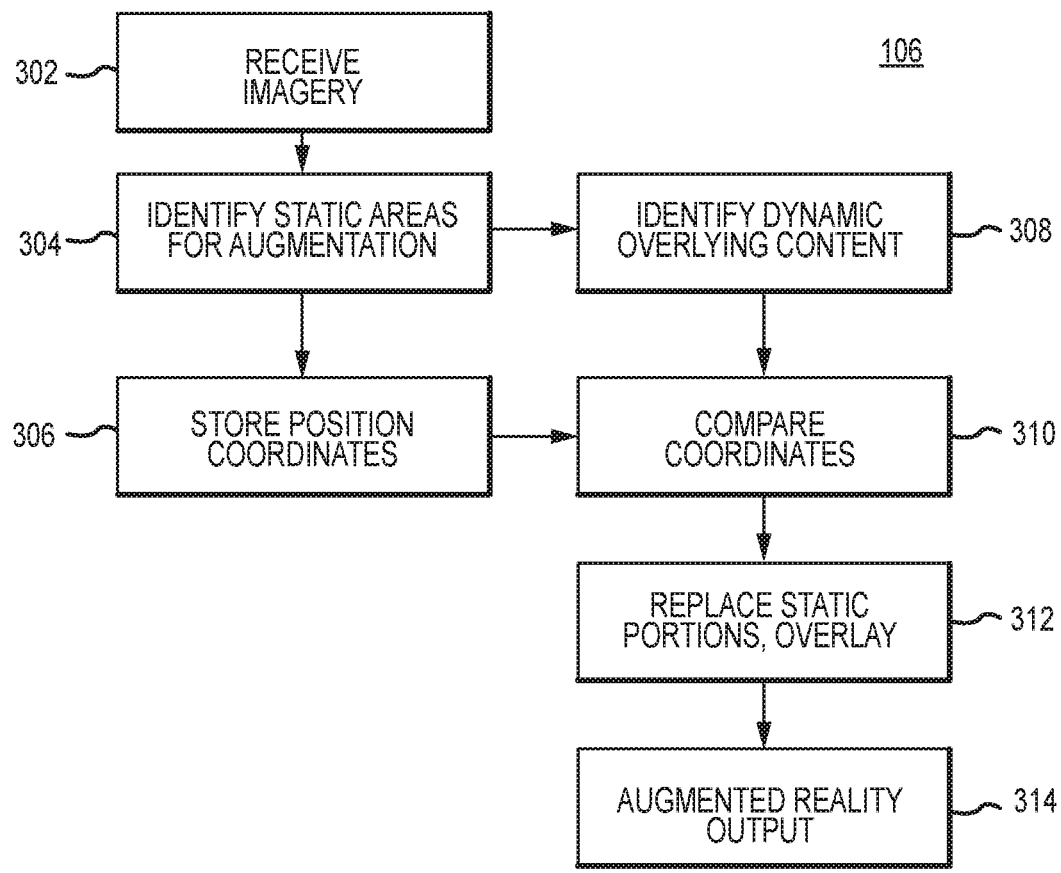

Example embodiments will hereinafter be described in conjunction with the following drawing figures, wherein like numerals denote like elements, and:

FIGS. 1 and 2 illustrate examples of digital video imagery before and after image replacement, respectively; and FIG. 3 is a flowchart showing an example process for performing image

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

According to various embodiments, static portions of a video stream that represent signs, advertisements or the like can be automatically replaced with other images. This concept can be used, for example, to replace images of billboards or other advertisements that are physically located within the physical space where a live sporting or other event is occurring, thereby allowing for dynamic updating of the imagery throughout the event. Dynamic replacement may also enable new revenue opportunities for event venues, teams, video producers, broadcasters and/or others as desired.

An additional benefit available in certain implementations is the replacement of local ads with ads that are more relevant to a wider (or at least different) television viewing audience. If a stadium has a prominent sign that advertises a business with only a local market reach (e.g., a hospital or a local restaurant), that particular sign may be relevant to people physically present in the stadium, but not to the wider audience that is viewing the television broadcast. That is, signs that are intended for viewing by people who are physically present at the actual premises of the event may not be relevant to some or all of the television audience viewing a live broadcast of the event. The imagery that represents the sign can therefore be replaced in the television broadcast, thereby leading to more relevant ads, more efficient use of advertising space and potentially increased advertising revenues for the stadium, team, broadcaster or the like.

To that end, various embodiments use digital computing hardware 105 to identify and/or replace certain portions of video imagery corresponding to signs, billboards or other static images within the captured video feed. FIG. 1, for example, illustrates an example of a video image 100 of the physical space 101 in which a live sporting or other event is occurring. A camera 102 captures a video feed in any digital format that is provided to computer system 105 for location recognition, image replacement and/or other processing as desired.

In various embodiments, computer system 105 analyzes one or more frames of the captured feed to recognize portions of the image 100 that remain static (e.g., unchanging) throughout the event. In the example illustrated in FIG. 1, the physical space 101 includes a region 111 that is painted or otherwise fashioned with a logo or similar advertisement for a particular brand of goods or services. Image 100 also includes regions 112A-F representing signs or other advertisements on the edge of the court, as well as other regions 113A-E and 114 representing other static portions of the video image. Each of these regions 112-114 may represent a different sign or other advertisement. The particular regions 111, 112, 113, 114 illustrated in the figures are simply examples; practical embodiments could use any number of regions that take any shape or size, or that represent any number of different advertisers. In some embodiments, some or all of the regions 111-114 could represent areas in the video imagery that are relatively unchanging even if the spaces are not currently used as advertising space. Static (but otherwise unused) space on floors, walls, roof, etc. may be recognized as a static location for image replacement in captured video, as desired.

Even though space 111 in image 100 is physically painted or otherwise fashioned to represent a particular good or service (e.g., "Brand1" in the illustrated example), the pixels representing space 111 in image 100 can be digitally replaced with different pixels to create a different image 200 (FIG. 2). FIG. 2 illustrates one example of the same image 100 after pixel replacement so that the updated imagery 200 can be included in the television broadcast to remotely-located viewers. In this example, the "Brand1" logo in image 100 is replaced with a different "Brand2" logo in image 200. "Brand2" may be a national brand instead of a local brand, for example. By replacing the pixels that make up the "Brand1" logo of image 100 with different digital graphics in image 200, the static content that is physically present in the space 101 can be altered in the broadcast video feed.

Camera 102 shown in FIG. 1 is any device capable of capturing digital imagery encompassing some or all of the premises 101. In various embodiments, multiple cameras 102 are provided, each with identified static regions 111-114. In the example shown in FIG. 1, camera 102 is a hemispherical or other wide-view camera that is capable of capturing panoramic, "fish eye" or similar large views of the premises. So-called "180-degree" or even "360-degree" cameras could be used in some embodiments. In some implementations, at least one camera 102 is positioned as an overhead camera that may be attached to the roof, rafters or the like of the event venue. Camera 102 could be equivalently placed and held in position by a drone or similar vehicle for any length of time. Camera 102 may have a field of view that is sufficient to capture the entire premises 101 in a single view; other embodiments may have pan-and-tilt, zoom and/or other controls to point the camera in a desired orientation, as desired, to capture desired video imagery. Camera 102 may be stationary and/or mobile, as desired, and any number of cameras 102 could be used in different embodiments.

Video imagery captured by one or more cameras 102 is provided to a video processing computer system 105. Computer system 105 typically includes one or more digital processors, along with associated memory and input/output interface hardware as would be expected in a conventional video processing computer. System 105 typically executes an automated process 106 to perform the various functions described herein; process 106 may be implemented using computer-executable instructions that are stored in memory for execution by one or more processors, as desired. Computer 105 may be physically located at the premises 101 where the event is occurring; equivalently, computer 105 may be remotely located to operate on a stream of compressed or uncompressed video content that is delivered by a wired or wireless data connection to the camera apparatus, as desired. Although the discussion herein primarily focuses upon live captured video that is processed in real time (or as close to real time as possible, given some limitations that are inherent in image capture, data communications, storage and processing delays, etc.), other embodiments could perform similar functions on previously-recorded digital imagery, as desired.

Processing performed by computer system 105 may include image recognition, image replacement and/or image enhancement, as desired. FIG. 3 illustrates an example of an automated process 300 to automatically augment the static imagery that is present in captured video for a live (or pre-recorded) video stream. Some implementations could perform the various functions of the process 300 using an automated routine 106 performed by digital computer system 105. Equivalent embodiments may separate processing of one or more functions across different computer systems; still other embodiments may augment the various functions shown in FIG. 3 in any manner, and/or may organize the various functions differently from that shown in the figure.

With reference to FIG. 3, process 300 suitably begins by the processing system 105 receiving digital video imagery from one or more cameras 102 (function 302). As noted above, cameras 102 may be physically located in an arena or other physical space where a live event is occurring to provide live captured video of the event. The video content may be received in any format. In various embodiments, video is received in relatively "raw" encoded format prior to any substantial compression. Although some embodiments could process compressed video, it will typically be beneficial to perform at least a partial decompression to permit pixel-level replacements of image portions. If replacement can be performed prior to compression of the captured video stream, some efficiency can be realized. In various embodiments, the raw video content is provided with at least some metadata describing the camera and time of capture. Various embodiments may also provide additional data from the camera, such as the orientation and zoom settings of the camera when the video was captured, to further aid in image identification and replacement. Metadata maybe separately delivered (e.g., via separate messages from the camera), and/or it may be incorporated into the raw video stream in any manner.

Static imagery can be recognized in the received video content in any manner (process 304). In various embodiments, pixel values of the received video stream are compared to identify pixels that do not vary from frame to frame. This technique is particularly useful if the video stream is received from a fixed camera 102, or at least a camera 102 that remains relatively motionless during the frame comparison time so that portions of images can be readily compared to each other. By recognizing pixel patterns that remain relatively unchanging over time, occurrences of similar patterns in future images can be automatically recognized as potentially-replaceable static content. Pixel values that are compared could include pixel luminosity in one or more color planes, or any combination of the pixel values from multiple planes (e.g., a sum or average of the pixel's values from multiple planes). A further embodiment could expand this concept by averaging pixel values over several frames, and then comparing subsequent pixel values to the previously-determined average, thereby further identifying deviation from an average value.

Further embodiments could automatically average pixel values over time to identify static images that may be occasionally obscured by dynamic action. The floor image 111 in FIG. 1, or example, may be occasionally obstructed by players, actors or the like. If a pixel varies for relatively short periods of time but regularly reverts to an average or other static value, however, that pixel may be associated with a static region (e.g., region 111) for replacement. Other embodiments could provide system 105 with "target images" representing images to be replaced. Various pixel comparison or other image recognition techniques could be used to identify target imagery in the received video. Any number of equivalent techniques for recognizing static pixels in received video imagery could be used in other embodiments.

Typically, computer system 105 will present the recognized areas 111-114 in the received imagery for review by a human operator using an appropriate editing interface. The interface will allow the operator to approve image replacement in the areas, and may also provide a selector to choose desired replacement imagery. Various embodiments could alternately or additionally allow the operator to manually select regions for replacement, if desired, rather than using the automated techniques described herein.

Static areas 111-114 of the captured video imagery are defined in any manner, and stored for subsequent processing (function 306). In various embodiments, the static areas are defined according to pixels in the received imagery; these definitions can be stored for subsequent replacement. Other embodiments may define the replacement portions in terms of the camera position at the time of capture: that is, in addition to storing the location of the relevant portion of the image, the camera location, camera orientation and/or zoom value is stored. If subsequently imagery is captured at the same location and orientation but at a different zoom value, for example, it may be desirable to scale the size of the replaced region to recognize that bigger or smaller position on the screen that is occupied by the static imagery.

Camera orientation may be defined in any manner. In some images, conventional two-dimensional (e.g., "X" and "Y") coordinates can represent pixels (or ranges of pixels) that can be replaced. In other images, it may be helpful to define the locations in spherical or pseudo-spherical coordinates, as appropriate. In the example of FIG. 1, for example, a hemispherical image space can be described according to a position on azimuth (e.g. in the plane defined by axes 141 and 143) and an angle 145 of elevation (e.g., deviation from the plane of axes 141 and 143). Various embodiments may also include a fourth coordinate to representing camera zoom, akin to a position along the vector defined by the other coordinates, to aid in sizing the replacement imagery. Other embodiments may describe the locations of static spaces in captured imagery using other parameters, or in any other manner.

Static locations 111-114 in the video stream may be identified according to any temporal scheme. In various embodiments, it may be desirable to recognize such locations prior to the broadcast to permit image replacement even at the outset of the broadcast. In embodiments that rely upon automatic detection of static imagery, the recognition process may occur at any regular or irregular interval, in response to user instructions, and/or on an ongoing basis, as desired. Ongoing recognition of static imagery may be computationally intense, but will typically provide the best blending of replacement imagery across a wider array of captured images.

Static images can be replaced in any manner. Various embodiments are able to recognize dynamic imagery that overlies the static images, as appropriate (function 308). This allows for replacement of only those pixels that correspond to the underlying image, with the dynamic content appearing "on top of" the replacement content. As noted above, dynamic content may be recognized by pixel values that deviate from the expected static value, or from an average of the previous values as desired.

To that end, various embodiments will check on a regular (or irregular) basis to confirm that the spaces lying within the previously-recognized static regions of the imagery remain as expected. If the pixel values deviate from frame-to-frame, then the deviated value may be assumed to by dynamic content that overlies the static image.

Typically, replacement images are sized and located to fill the spaces identified in the previously-stored coordinates of the static portions (function 310). One way to accomplish this is by considering pixel values of replacement images: if a static region of XX pixels by YY pixels is recognized, for example, a replacement image can be formatted to be the same size, thereby permitting pixel-level replacement of the static imagery with the replacement imagery.

When a replacement image is desired, the appropriate imagery is scaled or otherwise formatted to fit within the recognized static space of the captured video image (function 312). In various embodiments, the pixels previously-recognized to be presenting dynamic content can remain unchanged in the processed video stream so that the dynamic content continues to be present it the augmented image. That is, only pixels that have the expected value of the static image are replaced; pixels having unexpected values are retained, thereby allowing dynamic content to overlay the replaced imagery, as desired.

Various embodiments could perform additional modification to the replaced image, as desired. Images could be adjusted, for example, to adapt to image distortion due to camera movement or the like, especially within three-dimensional views of the event. If a camera moves through a stadium, for example, captured imagery can be distorted so that the captured imagery may no longer lie within the previously-identified region. Similarly, if a sign or other static image moves relative to the camera during the course of the event, the amorphic shape of the static image may change. If a rectangular object that was previously in the direct view of the camera is moved to a more peripheral position within the camera image, for example, the rectangular object will subsequently appear as a parallelogram with non-parallel sides due to changes in perspective. Various embodiments are therefore able to recognize changes in two- or three-dimensional amorphic imagery due to relative movement of the camera and the object, and to adapt the replacement image accordingly. Changes in amorphic shapes can be recognized through recognition of static image pixel values outside of the expected region (e.g., "image bleed"). Alternatively, changes in region shape can be predicted based upon changes in camera position and/or movements, as desired.

Still further embodiments adapt the replaced imagery to match the luminosity of the captured image. Ideally, the image replacement will be as transparent to the viewer as possible, so it can be beneficial to adapt the image brightness to conform to the surrounding imagery. To provide an example, a sign located in a sports stadium may be relatively bright during a day game when the sign is physically illuminated by bright sunlight. As the sun sets or the sign moves into shade, however, the sign will be less bright in the captured video. It will therefore be beneficial to adapt replacement imagery in a similar manner so that the replaced imagery is not too bright or too dim relative to the surrounding imagery. Various embodiments could monitor changes in luminance for captured pixels lying within the replacement region and adapt the luminance of captured imagery accordingly. Other embodiments could simply retain the luminance values of the captured imagery, but replace the chrominance values of the replaced pixels with those of the replacement image. Still other embodiments could take a hybrid approach, with pixel luminance values being retained but scaled based upon differences between captured and replacement imagery. If a dark-colored billboard is replaced with a light-colored image, for example, it may be desirable to reduce the brightness of the replacement image so the replacement image does not excessively stand out from the surrounding imagery.

The augmented video stream is output in any manner (function 314). In various embodiments, the augmented video stream is supplied for use in a television broadcast that represents the live event occurring in the physical space 101.

As described herein, then, images of real-world advertisements or objects that are physically present in a stadium, theater or other event space can be digitally and automatically replaced with other images, thereby leading to a more dynamic and relevant user experience. These basic concepts may be modified in any number of ways and implemented across a wide array of alternate but equivalent embodiments.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A process executable by a computing device to automatically replace static imagery in live video content, the process comprising:
   receiving live video content from a camera that captures a substantially hemispherical field of view that encompasses an event occurring in a physical space;
   initially identifying at least one location in the received live video content that represents static imagery for image replacement based upon analysis of the static imagery at a first time, wherein the static imagery has a first brightness at the first time, and wherein the at least one location in the received live video content that represents static imagery for image replacement is identified by comparing pixel values between a plurality of frames in the live video content to automatically identify consistent features between the plurality of frames, and wherein the at least one location representing the static imagery is defined by coordinates delineating boundaries of the static imagery within a three-dimensional space that represents the substantially hemispherical field of view;
   receiving subsequent live video content from the camera that captures the event occurring in the physical space at a second time occurring after the first time, wherein the static imagery has a second brightness at the second time;
   identifying dynamic imagery in the subsequent live video occurring within the at least one replacement location;
   detecting a difference between the first brightness of the static imagery at the first time and the second brightness of the static imagery at the second time;
   adapting the subsequent live video to replace the static imagery at the least one replacement location defined by the coordinates within the three dimensional space with a replacement image while retaining the dynamic imagery in the subsequent live video as an overlay of the static image, wherein the adapting comprises adjusting a luminance of the replacement image based upon the detected change in a brightness of the static imagery so that the luminance of the replacement image varies during the course of the live video in response to changing conditions in the physical space, and wherein the adapting further comprises automatically adjusting a shape of the replacement image to adapt to changes in a shape of the location that represents the static imagery; and providing the adapted subsequent live video comprising the replacement image as an output.

2. The process of claim 1 wherein the adapting comprises the computing device automatically adjusting the coordinates defining the boundaries of the static imagery to adapt to changes in a shape of the location resulting from movement of the camera relative to the static imagery.

3. The process of claim 2 wherein the coordinates defining the three dimensional space comprise a first coordinate defining an azimuthal position within the hemispherical field and a second coordinate defining a position on elevation within the hemispherical field.

4. The process of claim 3 wherein adapting comprises replacing the imagery within the boundaries defined by the coordinates with the replacement image.

5. The process of claim 4 wherein the coordinates defining the three dimensional space further comprise a third coordinate representing an amount of zoom applied in the live video content.

6. The process of claim 5 wherein the adapting comprises replacing the imagery within the boundaries defined by the coordinates with the replacement image and scaling a size of the replacement image according to the third coordinate representing the amount of zoom.

7. A computer system comprising:
an interface to receive live video content from a camera; and
a processor configured to automatically replace static imagery in the live video content by performing a process that comprises:
receiving live video content from a camera that captures an event occurring in a physical space;
initially identifying at least one location in the received live video content that represents static imagery for image replacement based upon analysis of the static imagery at a first time, wherein the static imagery has a first brightness at the first time;
receiving subsequent live video content from the camera that captures the event occurring in the physical space at a second time occurring after the first time, wherein the static imagery has a second brightness at the second time;
identifying dynamic imagery in the subsequent live video occurring within the at least one replacement location;
detecting a difference between the first brightness of the static imagery at the first time and a second brightness of the static imagery at the second time;
adapting the subsequent live video to replace the static imagery at the least one replacement location with a replacement image while retaining the dynamic imagery in the subsequent live video as an overlay of the static image, wherein the adapting comprises adjusting a luminance of the replacement image based upon the detected change between the first brightness and the second brightness of the static imagery so that the luminance of the replacement image varies during the course of the live video in response to changing conditions in the physical space; and
providing the adapted subsequent live video as an output;
wherein the camera captures a substantially hemispherical field of view that encompasses the physical space, and wherein the at least one location representing the static imagery is defined by coordinates delineating a three-dimensional space within the hemispherical field of view representing boundaries of the static imagery;
wherein the processor further adapts the coordinates that define the boundaries of the at least one location representing the static imagery in response to relative movement between the camera and the static imagery so that a shape of the replacement image is adapted in response to changes in a shape of the static imagery; and
wherein the adapting comprises replacing the imagery within the boundaries defined by the coordinates with the replacement image so that the shape of the replacement image varies with the relative movement between the camera and the static imagery.

8. The computer system of claim 7 at least one location in the received live video content that represents static imagery for image replacement is identified by the computing device comparing pixel values between a plurality of frames in the live video content to identify consistent features between the plurality of frames.

9. The computer system of claim 7 at least one location in the received live video content that represents static imagery for image replacement is identified by the computing device comparing averaging pixel values across a plurality of frames in the live video content to identify imagery that does not change between frames.

* * * * *